United States Patent
Altmann (10) Patent No.: US 9,654,810 B2
(45) Date of Patent: May 16, 2017

(54) MECHANISM FOR PARTIAL ENCRYPTION OF DATA STREAMS

(75) Inventor: William Conrad Altmann, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 649 days.

(21) Appl. No.: 12/842,190

(22) Filed: Jul. 23, 2010

(65) Prior Publication Data

US 2012/0020475 A1  Jan. 26, 2012

(51) Int. Cl.
*H04N 21/2347* (2011.01)
*H04L 9/36* (2006.01)

(52) U.S. Cl.
CPC ......... *H04N 21/23476* (2013.01); *H04L 9/36* (2013.01); *H04L 2209/60* (2013.01)

(58) Field of Classification Search
CPC ........ G11B 20/00456; G11B 20/00463; G11B 20/005; G11B 20/0021; H04N 2005/91307; H04N 5/913; H04N 21/23476; H04L 9/18; H04L 9/06; H04L 2209/60; H04L 9/36
USPC ...................... 726/26; 380/42, 200, 236, 239
See application file for complete search history.

(56) References Cited

U.S. PATENT DOCUMENTS

| | | | |
|---|---|---|---|
| 4,517,669 A | 5/1985 | Freeburg et al. | |
| 5,241,382 A * | 8/1993 | Paik et al. | 375/240.25 |
| 5,442,400 A | 8/1995 | Sun et al. | |
| 5,541,662 A * | 7/1996 | Adams et al. | 348/460 |
| 6,141,691 A * | 10/2000 | Frink et al. | 709/233 |
| 6,191,822 B1 * | 2/2001 | Smyers | 348/552 |
| 6,914,637 B1 * | 7/2005 | Wolf et al. | 348/473 |
| 7,076,652 B2 * | 7/2006 | Ginter et al. | 713/153 |
| 7,117,003 B2 | 10/2006 | Kayama et al. | |
| 7,162,642 B2 * | 1/2007 | Schumann et al. | 713/189 |
| 7,558,537 B2 | 7/2009 | Trachewsky et al. | |
| 7,912,095 B2 | 3/2011 | Zeng et al. | |
| 2002/0196939 A1 | 12/2002 | Unger et al. | |
| 2004/0247122 A1 * | 12/2004 | Hobrock | H04L 63/0428 380/241 |
| 2005/0144468 A1 * | 6/2005 | Northcutt et al. | 713/189 |
| 2006/0120523 A1 | 6/2006 | Kurotaki | |
| 2006/0269060 A1 | 11/2006 | Candelore et al. | |
| 2007/0009232 A1 * | 1/2007 | Muraki et al. | 386/95 |
| 2007/0056000 A1 | 3/2007 | Pantalone et al. | |
| 2007/0118864 A1 * | 5/2007 | Champion et al. | 725/81 |
| 2007/0133797 A1 * | 6/2007 | Schipper et al. | 380/231 |

(Continued)

FOREIGN PATENT DOCUMENTS

| | | | |
|---|---|---|---|
| CN | 1607793 A | 4/2005 | |
| CN | 1842857 A | 10/2006 | |

(Continued)

OTHER PUBLICATIONS

"High-Definition Multimedia Interface Specification Version 1.3", HDMI Licensing LLC, Jun. 22, 2006, 237 pages.

(Continued)

*Primary Examiner* — Tamara T Kyle
(74) *Attorney, Agent, or Firm* — Fenwick & West LLP (57) ABSTRACT

Embodiments of the invention are generally directed to partial encryption of data stream. An embodiment of a method includes receiving, at a data transmitting device, a data stream having content including one or more of audio content, video content, and control content, determining one or more content that are to be encrypted. The method further includes partially encrypting the data stream by encrypting the one or more content, and leaving other content unencrypted, and transmitting, from the data transmitting device, the partially encrypted data stream to a data receiving device.

15 Claims, 10 Drawing Sheets (56) References Cited

U.S. PATENT DOCUMENTS

| | | | |
|---|---|---|---|
| 2007/0162981 A1* | 7/2007 | Morioka et al. | 726/30 |
| 2007/0244822 A1 | 10/2007 | Hogan | |
| 2008/0159532 A1 | 7/2008 | Verma | |
| 2008/0253466 A1* | 10/2008 | Fu | H04N 21/2389 375/240.26 |
| 2009/0060182 A1 | 3/2009 | Killian et al. | |
| 2009/0248924 A1* | 10/2009 | Melin | 710/63 |
| 2009/0316889 A1* | 12/2009 | MacDonald et al. | 380/201 |
| 2010/0027604 A1 | 2/2010 | Vaidyanathan et al. | |
| 2010/0118927 A1 | 5/2010 | Ichimura et al. | |
| 2010/0287609 A1* | 11/2010 | Gonzalez et al. | 726/14 |
| 2011/0013888 A1 | 1/2011 | Sasaki et al. | |
| 2011/0088056 A1 | 4/2011 | Ansari | |
| 2011/0119709 A1 | 5/2011 | Kim et al. | |
| 2011/0134862 A1 | 6/2011 | Huang et al. | |
| 2011/0149032 A1 | 6/2011 | Choi et al. | |
| 2011/0150215 A1 | 6/2011 | Domingo et al. | |
| 2012/0020475 A1 | 1/2012 | Altmann | |
| 2012/0076296 A1 | 3/2012 | Graunke | |

FOREIGN PATENT DOCUMENTS

| | | | |
|---|---|---|---|
| EP | 1519581 A1 * | 3/2005 | |
| JP | 2005-514873 A | 5/2005 | |
| JP | 2008-258697 A | 10/2008 | |
| KR | 10-2000-0060590 | 10/2000 | |
| KR | 10-2001-0062821 | 7/2001 | |
| TW | I256212 | 6/2006 | |
| TW | I313556 | 8/2009 | |
| TW | I313995 | 8/2009 | |
| WO | WO 03/058946 A2 | 7/2003 | |
| WO | WO 2005/091590 A1 | 9/2005 | |
| WO | WO 2007/064159 A1 | 6/2007 | |
| WO | WO 2010/051281 A2 | 5/2010 | |

OTHER PUBLICATIONS

"High-bandwidth Digital Content Protection System Interface Independent Adaptation Specification Revision 2.0", Digital Content Protection LLC, Oct. 23, 2008.

International Search Report and Written Opinion of the International Searching Authority dated Jan. 31, 2013, in International Patent Application No. PCT/US2012/050334, 7 pages.

"International Search Report dated Feb. 9, 2012, in International Patent Application No. PCT/US2011/044518, 3 pages".

Office Action mailed Jan. 30, 2013, in U.S. Appl. No. 13/269,450, 34 pages.

Written Opinion of the International Searching Authority completed Jan. 20, 2012, in International Patent Application No. PCT/US2011/044518, 3 pages.

Digital Content Protection LLC: "High-Bandwidth Digital Content Protection System," Dec. 21, 2006, pp. 1-90, [Online] [Retrieved on Apr. 3, 2013] Retrieved from the Internet<URL:http://www.digital-cp.com/files/static_page_files/8006F925-129D-4C12-C87899B5A76EF5C3/HDCP_Specification%20Rev1_3.pdf>.

Eidson, S. et al., "HDMI: High-Definition Multimedia Interface," 2003 SID International Symposium Digest of Technical Papers, May 20-22, 2003, pp. 1024-1027.

European Extended Search Report, European Application No. 11810271.4, Mar. 5, 2015, 9 pages.

European Extended Search Report, European Application No. 12838010.2, Mar. 12, 2015, 11 pages.

Hitachi et al., "HDMI Specification Version 1.3a," Nov. 10, 2006, [Online] [Retrieved on Apr. 8, 2008] Retrieved from the Internet<URL:http://www.hdmi.org/download/HDMISpecification13a.pdf>.

Japanese Office Action, Japanese Application No. 2013-520805, Feb. 10, 2015, 5 pages (with English summary).

"Mobile High-Definition Link (MHL (TM)) Technology Bridge Low Cost, MHL-to-HDMI Compliant Bridge for HD Video-Connectivity Between Mobile Devices and HDMI DTVs," Aug. 31, 2008, [Online] [Retrieved on Jul. 21, 2014] Retrieved from the Internet<URL:http://www.datasheetdir.com/go-SII9290.pdf>.

Taiwan Office Action, Taiwan Application No. 100125874, Feb. 25, 2015, 9 pages (with concise explanation of relevance).

Chinese First Office Action, Chinese Application No. 201180035903.8, Aug. 5, 2015, 17 pages.

Korean Office Action, Korean Application No. 10-2013-7004499, Sep. 11, 2016, 9 pages.

European Examination Report, European Application No. 11810271.4, Mar. 10, 2017, 7 pages.

* cited by examiner

MECHANISM FOR PARTIAL ENCRYPTION OF DATA STREAMS

TECHNICAL FIELD

Embodiments of the invention generally relate to the field of data communications and, more particularly, to performing partial encryption of data streams.

BACKGROUND

High-bandwidth Digital Content Protection (HDCP™) is utilized for digital content protection, providing for encryption of content or data transmitted over digital interfaces, such as High-Definition Multimedia Interface (HDMI™), which is a compact audio/video interface for transmitting uncompressed digital data. In today's HDCP protocol, all types of content or data (e.g., audio data, video data, control data, etc.) of data streams is encrypted when communicated between a transmitting system and a receiving system. Therefore, none of the content of an encrypted data stream can be used until that content is decrypted at a downstream HDCP receiver (e.g., high-definition television (HDTV)). In case of Mobile High-Definition Link (MHL™), a bridge chip can be employed to serve as an intermediate receiving device and facilitate communication and transmission of MHL-based data streams between mobile devices (e.g., cell phones) and HDMI receivers. MHL is distinguished from HDMI in that MHL refers to a mobile audio/video interface standard for connecting mobile devices (e.g., smart phones) to other devices (e.g., HDTV). Neither HDMI nor MHL requires or defines encryption and HDCP is one of many encryption processes that can be employed for encryption purposes.

Since, using existing HDCP protocol, all types of content in HDMI and MHL data streams are fully encrypted, even in a case where it would be beneficial to amend or at least view certain content of the stream (such as control content for formatting reasons), the entire data stream is required to be transmitted to the end receiving device where it has to be completely decrypted before it can be accessed and analyzed.

It is contemplated that various signaling protocols (e.g., Original Encryption Status Signaling (OESS), Enhanced Encryption Status Signaling (EESS)) may be used between transmitters and receivers for providing and detecting encrypted data streams, such as whether encryption of a data stream is enabled or disabled. For example, EESS protocol is used with the HDMI protocol (and is an optional feature in the Digital Visual Interface (DVI™) protocol), while OESS is used with the DVI protocol.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are directed to performing partial encryption of data streams.

In a first aspect of the invention, an embodiment of a method includes receiving, at a data transmitting device, a data stream having content including one or more of audio content, video content, and control content, and determining one or more content that are to be encrypted. The method further includes partially encrypting the data stream by encrypting the one or more content, and leaving other content unencrypted, and transmitting, from the data transmitting device, the partially encrypted data stream to a data receiving device.

In a second aspect of the invention, an embodiment of a system includes a data processing device having a storage medium and a processor coupled with the storage medium, the data processing device further having a data transmitting device coupled to a data receiving device. The data transmitting device having a partial encryption mechanism, the data transmitting device to receive a data stream having content including one or more of audio content, video content, and control content, and determine one or more content that are to be encrypted. The data transmitting device is further to partially encrypt the data stream by encrypting the one or more content, and leave other content unencrypted, and transmit the partially encrypted data stream to the data receiving device coupled to the data transmitting device.

In a second aspect of the invention, an embodiment of an apparatus includes a data transmitting device having a partial encryption mechanism, the data transmitting device to receive a data stream having content including one or more of audio content, video content, and control content, and determine one or more content that are to be encrypted. The data transmitting device is further to partially encrypt the data stream by encrypting the one or more content, and leave other content unencrypted, and transmit the partially encrypted data stream to a data receiving device coupled to the data transmitting device.

DETAILED DESCRIPTION

Embodiments of the invention are directed to performing partial encryption of data streams.

In one embodiment, partial encryption of data streams is disclosed such that certain content (such as video content and audio content) of the data stream is encrypted, while certain other content (e.g., control content) remains unencrypted so that access to, for example, the unencrypted control data can be provided without compromising protection of other forms of content, such as video and audio content, of such data streams. In other words, selective partial encryption of data streams is disclosed such that while video and/or audio content of a data stream is encrypted for protection, its control content remains unencrypted and in the clear for access and analysis. It is contemplated that any type of content (e.g., audio, video, or control) can be encrypted or left unencrypted. For example, in a case where the background audio does not carry any protection value, the audio content of that data stream may not be encrypted. Similarly, some (as opposed to all) of the audio content can be left encrypted or any combination of contents (such as audio and control content) may be left unencrypted and other content (such as video content) may be encrypted. Such flexibility of content encryption in a data stream is provided. The terms "content" and "data" are regarded as synonymous and used interchangeable throughout this document.

In one embodiment, a configuration enhancement to a transmitter (also referred to as "source") is made so that encryption of content that is to be encrypted is encrypted, while other content in the data stream is left unencrypted. Similarly, other enhancements are made to a last downstream receiver (also referred to as "sink") and an intermediate downstream receiver (also referred to as "bridge device" having a bridge chip) so they have the ability to recognize and handle partially encrypted data streams. In one embodiment, further enhancements are provided such as allowing any existing control content of HDCP data streams (e.g., HDMI data stream, MHL data stream, etc.) to be encrypted (for example, as specified in HDCP version up through version 1.4), while allowing additional data island periods (also referred to as "data islands") with control information to remain unencrypted. A protocol to differentiate between data-to-be-encrypted and data-to-remain-unencrypted is also introduced and described in this document. One advantage of letting control content remain unencrypted is to allow for it to be accessed, read, examined, and analyzed without the need for decrypting any of it. Another advantage, in one embodiment, in case of an MHL data stream, is to allow a bridge chip or port processor to insert and/or remove unencrypted data island periods from the overall data stream, without affecting cipher-handling at either end of the link carrying the data stream. The use, for example, of this novel protocol is coordinated during initial authentication by means of additional register bits at an HDCP display data channel (DDC) device address of a receiver or receiving device or system. Various protocols (e.g., encryption/decryption protocol, encrypted data/unencrypted data detection protocol, etc.) may include HDCP, and data signals may include HDMI or MHL signals, but embodiments are not limited to such technologies.

In one embodiment, a bridge device serving as an intermediate carrier of a protected content data stream is utilized to view inside a data stream without making the content itself visible outside an integrated circuit (chip or processor). This way, the intermediate stage can process the control content without the risk of the content being copied in an unprotected form. Further, the bridge device may insert or remove data from the data stream without affecting the sequence of encrypted data from a source to a sink via an intermediary bridge device.

It is contemplated that a number of logic/circuits may be employed at receiver and transmitter chips, such as a locking circuit, Phase Lock Loop (PLL), Delay Lock Loop (DLL), encryption logic, decryption logic, authentication engine, one or more (background/foreground) processing engines, or the like. However, embodiments of the invention are not limited to HDMI and MHL and may be used for any other type of data streams. Similarly, embodiments of the invention are not limited to HDCP and can be applied to and used with other encryption protocols or mechanisms. However, HDCP, HDMI, and MHL or the like are used here for brevity, clarity, and ease of explanation.

Figure 1:
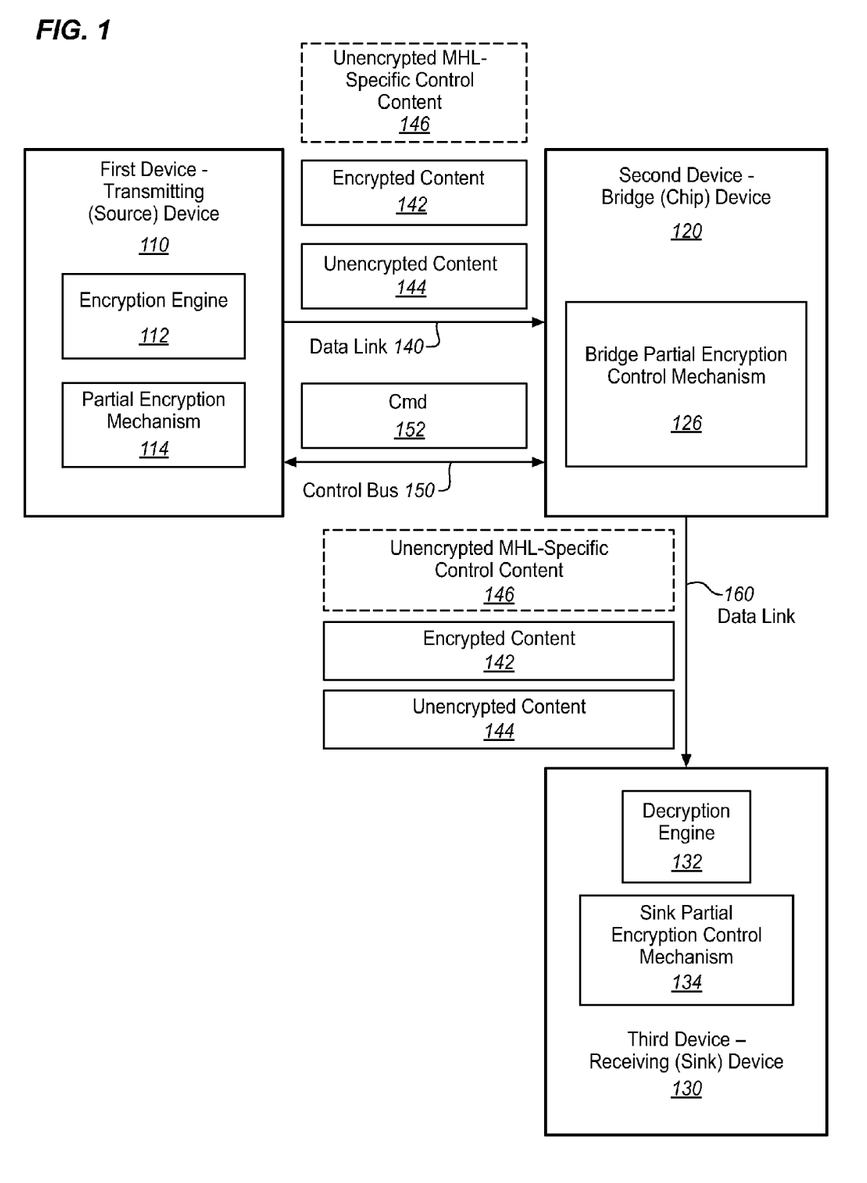
FIG. 1 illustrates a system for partial encryption in a data stream according to one embodiment of the invention.

FIG. 1 illustrates a system for partial encryption in a data stream according to one embodiment of the invention. In the illustrated embodiment, a first device 110 is a data transmitting device (also referred to as "source" or "enhanced transmitter") including an encryption engine 112 to perform encryption of content of data streams. In one embodiment, the first device 110 further includes a partial encryption mechanism 114 to, in communication with the encryption engine 112, facilitate partial encryption of data streams, such as encrypting a particular type of content (e.g., audio content) while leaving other types of content (e.g., video content and control content) unencrypted as described throughout this document. The partial encryption mechanism 114 includes software modules, hardware components, or any combination thereof, such as firmware having a combination of software and hardware to create an enhanced transmitting device 110 such that it can perform partial encryption according to embodiments of the invention. As illustrated, the first device 110 transmits a data stream to a second device, which in this illustration is a bridge device 120. The second device may then transmit the received data stream to a third device 130, which may be a data receiving or sink device that utilizes the data stream.

In one embodiment, the first device 110 transmits data, including encrypted data 142, unencrypted data 144, and any other additional content, such as unencrypted MHL-specific control content 146, to the second device 120 via a data link 140. A command bus 150 may be used to transmit commands 152 between first and second devices 110, 120, such as a command is sent from the first device 110 to the second device 120, reading back information from the second device 120 that the second device 120 can support the enhanced transmitter's 110 intent to partially encrypted the data stream. In one embodiment, the second device 120, which is a bridge chip in this illustration, is enhanced by having a bridge partial encryption control mechanism ("PEC mechanism") to, in communication with the partial encryption control mechanism 114 of the first device 110, receive and detect and comprehend both the encrypted and unencrypted content 142-146 of the data stream received from the first device 110. The unencrypted content 144 (e.g., unencrypted control content) of the data stream may be used for viewing, analysis, amendment, and the like.

In an example, the second device may then transmit the encrypted and unencrypted content 142-146 of the data stream to the third device 130 over a second data link 160, with the third device 130 being a data receiving device (also referred to as a "sink" or "enhanced receiver") utilizing the received data stream. The third device 130 includes a decryption engine 132 for the decryption of encrypted content 142 received at the third device 130. In one embodiment, the third device 130, like the second device 120, includes a sink PEC mechanism 134 to receive the encrypted and unencrypted content 142-146 from the second device 120 to receive and detect and comprehend the combination of encrypted and unencrypted content 142-146 received from the first device 110.

A typical data stream contains three types of content, such as video content, audio content, and control content. Video content may be carried in a video data period, in which each pixel value is encrypted by a mask generated in the transmitting device 110. Audio content may be carried in a type of packet within a data island period, in which each data payload byte is encrypted by a mask generated in the transmitting device 110. Control data (in this context) may be carried in different types of packets within data island periods, in which each payload byte of which is encrypted by the same type of transmitting device-generated mask. Mask generation may proceed from clock cycle-to-clock cycle, advancing for each clock period in a video data period or a data island period. The mask generator may be "re-keyed" periodically according to the protocol in the HDCP specification.

Historically, the original intent of HDCP was to protect video content of a DVI link, but then with the expansion to include audio content and the encryption of that audio content, control content was also included in the encryption protocol, even though the control content may not warrant encryption. In this case, the video content and audio content of a data stream may be encrypted and sent as the encrypted content 142, while the control content is left unencrypted and visible to various receiving devices along the path from the transmitting device 110 all the way to the downstream sink or receiving device 130. One such device includes the bridge device 120 where the control content protocol from the input port to the output port may be altered without compromising the protection of HDCP, while port processors may select an input port and output the control content using a single output port, without affecting the protection provided by the HDCP. Further details of the embodiment of partial encryption are disclosed in subsequent figures.

Figure 2:
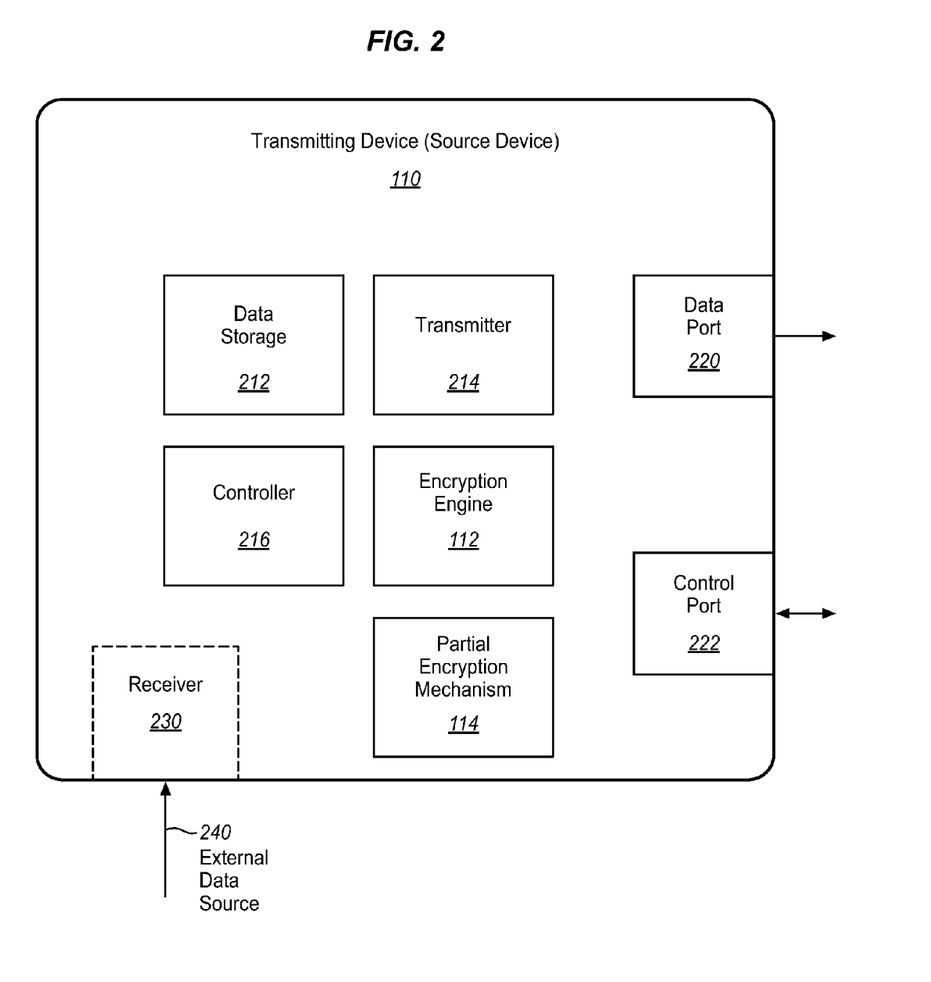
FIG. 2 illustrates a source transmitting device according to one embodiment of the invention.

FIG. 2 illustrates a source transmitting device according to one embodiment of the invention. In some embodiments, a source transmitting device 110 (a source) includes a transmitter 214 for the transmission of data streams, a controller 216 to control data transmission, and an encryption engine 218 to encrypt content of the data stream (as shown in FIG. 1) prior to transmission to another device (e.g., a receiving device, such as an intermediary bridge device or a sink). The transmitting device 110 may further include data storage 212 for storage of data prior to transmission, and a receiver 230 to receive certain data from an external data source 240 prior to transmission.

The transmitting device 110 may further include a data port 220 and a control port 222. The transmitting device 110 may change the transmission of data stream during operation, such as while transmitting the data stream in multiple different modes over the data port 220 may, for example, transition from a first mode to a second mode. The transmitting device 110 transmits a message via the control port 222 to inform (or warn) a receiving device of certain situations, such as letting the receiving or bridge device know that the transmitting device 110 is sending a partially-encrypted data stream that includes both encrypted content and unencrypted content. The transmitting device 210 then may wait until an acknowledgement (ACK) is received at the control port 222 before transmitting the partially-encrypted data stream or may continue with the transmission without having received the acknowledgement.

In one embodiment, the source transmitting device 110 includes a partial encryption mechanism 114 to facilitate the source transmitting device 110 to generate a partially-encrypted data stream by encrypting certain protectable content of the data stream, while leaving the other content unencrypted. The partial encryption mechanism 114 may perform the task of partial encryption of the data stream in working with the encryption engine 112. The partial encryption mechanism 114 includes various components to perform a number of tasks including the aforementioned partial encryption, identifying and separating the content that is to be encrypted versus the content that is to be left unencrypted, transmitting the partially-encrypted data stream to a downstream receiving device, and the like. These components of the partial encryption mechanism 114 include software modules, hardware components, or a combination thereof, such as firmware.

Figure 3A:
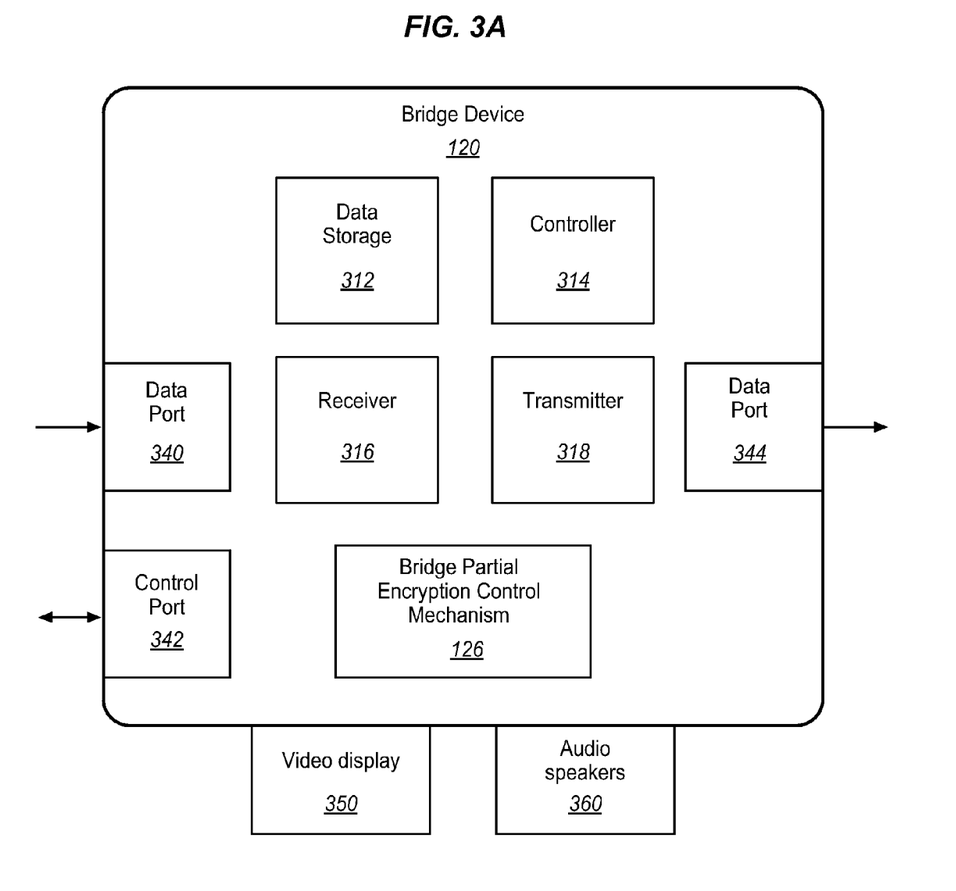
FIG. 3A illustrates a bridge device according to one embodiment of the invention.

FIG. 3A illustrates an embodiment of a bridge device according to one embodiment of the invention. A bridge device 120 receives and utilizes the partially-encrypted data stream received from the source transmitting device and further transmits the partially-encrypted data stream to a downstream sink receiving device. In one embodiment, the bridge device 120 includes a bridge PEC mechanism 126 that includes a number of entities to facilitate the bridge device 120 to identify the encrypted content, and to identify, access, read, comprehend and even modify the unencrypted content of a partially-encrypted data stream being received from a source transmitting device without having the need to decrypt the entire data stream. These components of the bridge PEC mechanism 126 include software modules, hardware components, or a combination thereof, such as firmware.

The bridge device 120 may include a controller 314 to control data operation, a receiver 316 to receive a data stream, a transmitter 318 to transmit a data stream, together with data ports 340 and 344 for receipt and transmit, respectively, of a data stream, and a control port 342 for exchange of commands with the transmitting device. The bridge device 120 may be coupled with one or more devices, such as a video display 350, audio speakers 360, a data storage device 312 for storage of received content of the data stream, or the like. In one embodiment, the bridge device 120 is capable of receiving a partially-encrypted data stream and is further capable of examining and even modifying the unencrypted content (e.g., control content) of the data stream without decrypted or re-encrypting the unencrypted content or even participating in the authentication process of the unencrypted content.

Figure 3B:
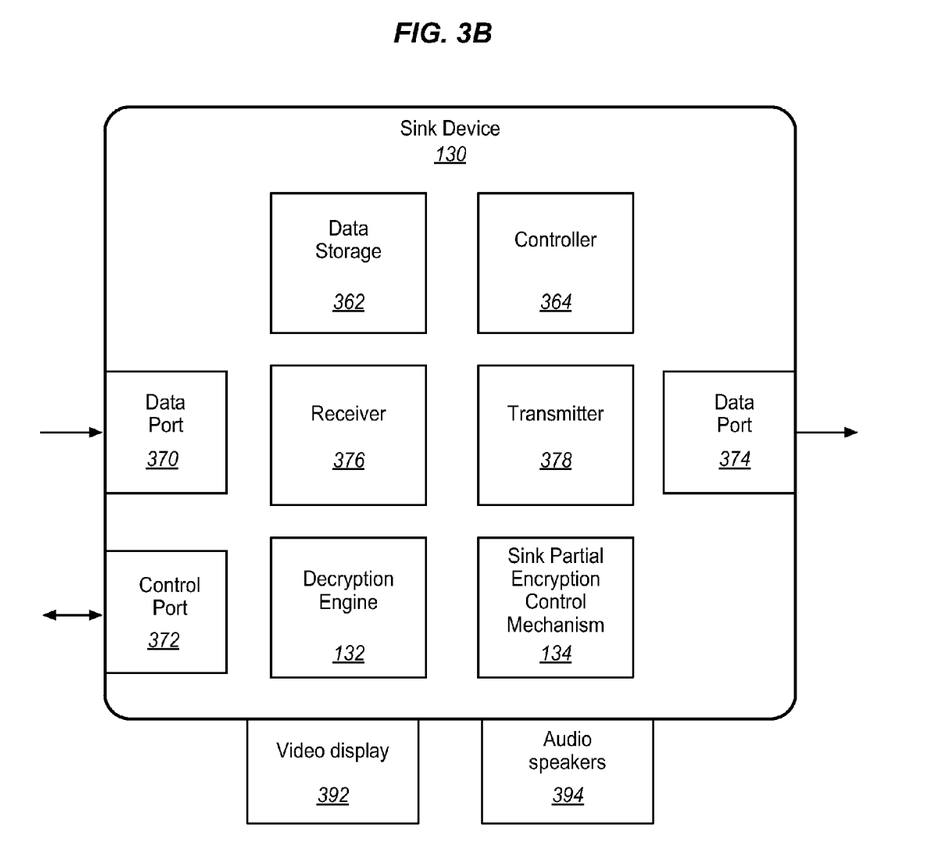
FIG. 3B illustrates a sink receiving device according to one embodiment of the invention.

FIG. 3B illustrates a sink receiving device 130. The sink receiving device 130 may serve as a downstream sink device to receive a partially-encrypted data stream and provide or render the data stream through video display 392 and audio speakers 394. Several components of the receiving device 130 are similar to the components of bridge device 120 and, for brevity and avoiding repetition, such common components are not discussed here. In one embodiment, the sink receiving device 130 includes a sink partial encryption control mechanism 134 that includes a number of entities to facilitate the sink receiving device 130 to identify the encrypted content, and to identify, access, read, comprehend the unencrypted content of a partially-encrypted data stream being received from a source transmitting device. The sink receiving device may provide any of the content of the partially-encrypted data stream through the video display device 392 and/or the audio speakers 394. As with the bridge PEC mechanism 126, these components of the sink PEC mechanism 134 include software modules, hardware components, or a combination thereof, such as firmware. The sink receiving device 130 further includes a decryption engine 132 to decrypt the encrypted content of a partially-encrypted data stream received from a bridge device or a source transmitting device.

Figure 4A:
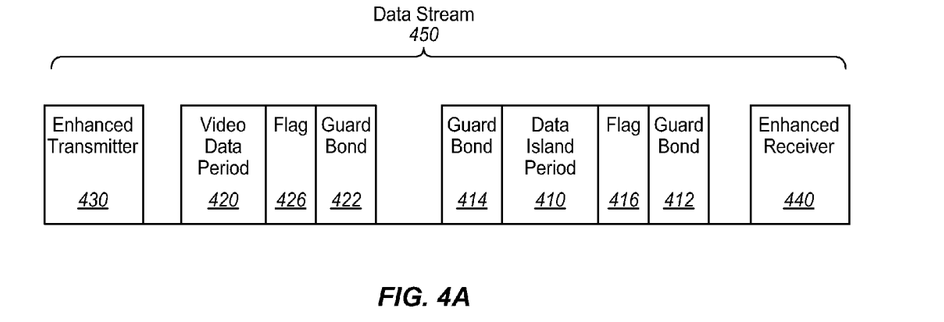
FIGS. 4A and 4B illustrate partial encryption of a data stream according to one embodiment of the invention.

FIG. 4A illustrates partial encryption of a data stream according to one embodiment of the invention. HDCP encryption begins, in HDMI links, immediately after the leading guardband characters 412 and 422 of video data period 410 and data island period 420, respectively, being communicated between an enhanced transmitter 430 and enhanced receiver 440. For a video data period 420, encryption of the content proceeds for each pixel to the last pixel the video data period 420 so there is no trailing guardband to avoid. In case of a data island period 410, however, encryption of the content proceeds for each clock period (with packet data in each clock period) until the trailing guard band 414 (which is not encrypted) is reached. In one embodiment, a flag 416, 426, having an additional character, is inserted after the leading guardband 412, 422 for both the data island and video data periods 410, 420. The flag or flag character 416, 426 serves as an encryption/decryption indication for encryption and decryption engines of the enhanced transmitter 430 and the enhanced receiver 440, respectively. In one embodiment, when the flag 416, 426 is set, the encryption engine of the enhanced transmitter 430 encrypts the relevant content of the data island period 410 or video data period 420 for which the flag 416, 426 is set, while leaving the other content of the data island and video data periods 410, 420 unencrypted for which the flag is 416, 426 is not set.

In one embodiment, if a data stream 450 arriving at the enhanced transmitter 430 is already encrypted, the partial encryption mechanism 114 of the enhanced transmitter 430 can still insert a flag character into the clocked stream by using the last control period character before the leading guardband 412, 422 to be the first character of the leading guard band 412, 422, and repeating this process of "shifting to one clock cycle earlier" to "move the incoming guardband one cycle earlier in time" and leaving one clock period after it to insert the flag character 416, 426. Such operation is based on First-In-First-Out (FIFO) or other similar buffering schemes. In another embodiment, the entire data island and video data periods 410, 420 can delayed one clock period to insert the flag 416, 426 after the leading guardband 412, 422. Since HDMI mandates that the data island period 410 and the video data period 420 be separated from each other by a control period of no less than 12 clock periods, there is room for the inserted flag character 416, 426, even allowing for the eight clock periods to insert a preamble. For example, the clock period may be revised to allow the minimum control period to be one clock period smaller without it being zero.

Figure 4B:
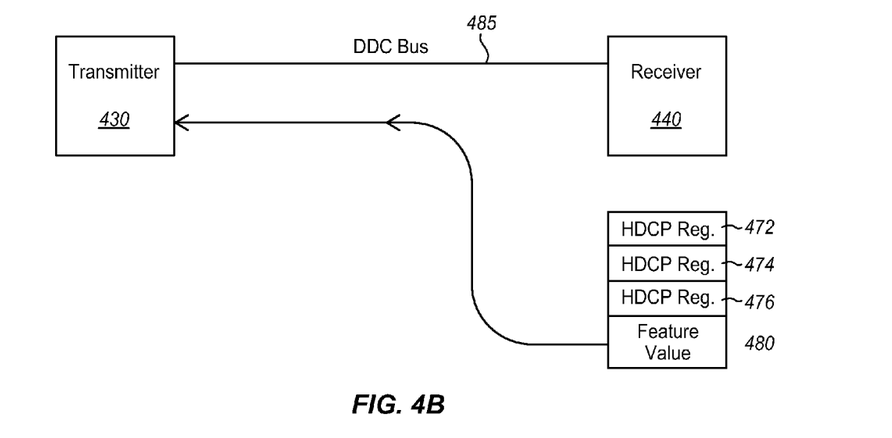

In another embodiment, a new value is used as a character in the leading guardbands 412, 422. The characters within any sequence of leading guardbands 412, 422 include identical values, but these values can be selected from four choices rather than the two choices offered in the HDMI protocol. The four choices include: encrypted data island period, unencrypted data island period, encrypted video data period, and unencrypted video data period. Referring now to FIG. 4B, using this mechanism, the enhanced transmitter and receiver 430, 440 coordinate which types of content (e.g., audio, video, control) are to be encrypted (or left unencrypted). In one embodiment, the enhanced transmitter 430 reads a feature value 480 from a register 472-476 in the (HDCP) enhanced receiver 440 at its device address on a display data channel (DDC) bus 485 (a control bus (CBUS) may be used in an MHL-based system). The DDC refers to a communication channel based on the I$^2$C bus specification. HDMI may specifically require support for an Enhanced DDC (E-DDC), which may be used by a source transmitter to determine the audio/video formats a sink receiver supports. The CBUS refers to a mechanism for a source device or a sink device to discover connectivity to its corresponding MHL-compliant sink device and source device, respectively, and may include a single wire (one-bit), bi-directional control bus.

In one embodiment, according to the bits in this feature value 480, the enhanced transmitter 430 chooses to encrypt (a) video, (b) audio, or (c) one or more types of packets in the data island period 410. If more than one packet is included in any one data island period 410, then all packets in that data island period 410 are either encrypted or left unencrypted since there is only one leading guardband 412 and one inserted flag character 416 per data island period 410. The segmentation of packets into separate data island periods 410 is controlled by the enhanced transmitter 430.

The enhanced transmitter 430, in one embodiment, encrypts both video content and audio content, but leaves the control content (such as InfoFrames, data packets, etc.) unencrypted. The enhanced receiver (such as a downstream bridge device, a port processor, or other receiving device) can, using the partial encryption control mechanism, detect and read these data packets and determine aspects of the data stream as (a) video mode, (b) link mode [red, green, blue (RGB), YCbCr, etc.], (c) audio content protection [ACP] settings, etc. Using this information or reacting to changes in this information from one moment to the next, a downstream enhanced receiver 440 prepares itself for the new configuration without having to first decrypt the entire HDCP stream. In other words, accordingly to one embodiment, using the partial encryption techniques, the control content of the data stream is provided unencrypted, eliminating the need on the receiving end to decrypt the entire data stream.

In another embodiment, video content of the data stream is encrypted but the audio content (and the control content) remain unencrypted or vice versa. A content provider (e.g., cable headend), in this case, indicates (such as through upstream from the enhanced transmitter 430) that the video content needs be protected and thus encrypted, but the audio content may remain unprotected and thus unencrypted. An example of such a case would be a video presentation that requires protection, but some music overlay or irrelevant background sound (e.g., birds chirping, police car sound, etc.) is not regarded as worthy of protection or encryption. Conversely, audio content may be protected and encrypted and sent from the enhanced transmitter 430 with an "overlaid" video pattern (e.g., swirling lights, etc.) that does not need encryption. Using this technique, a downstream receiving device 440 can strip off the unencrypted content without affecting the encrypted content or the counters incrementing the encryption/decryption mask values.

Figure 5:
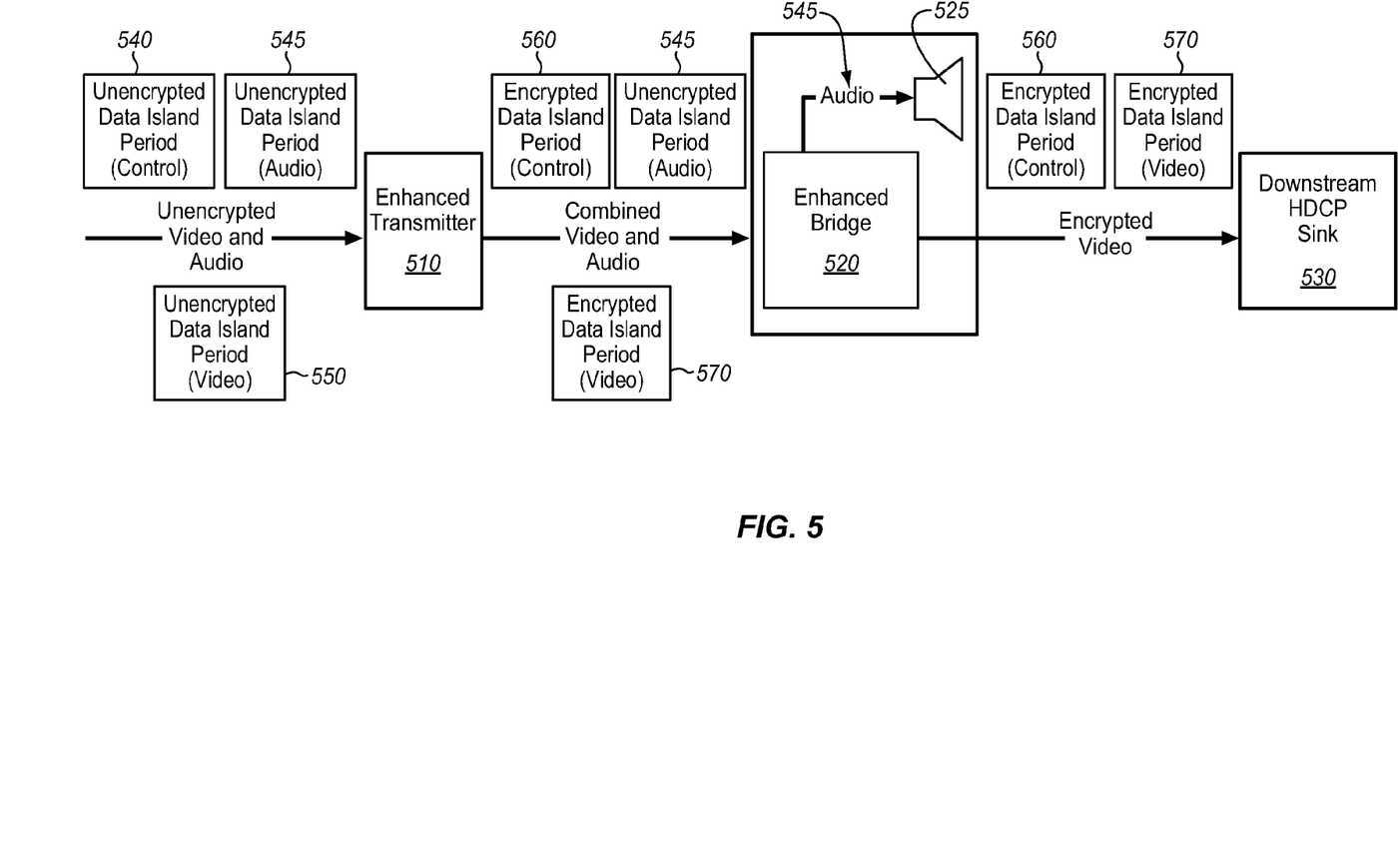
FIG. 5 illustrates partial encryption of a data stream according to one embodiment of the invention.

FIG. 5 illustrates partial encryption of a data stream according to one embodiment of the invention. In the illustrated embodiment, a data stream having unencrypted data island period (including unencrypted control content 540 and unencrypted audio content 545) and unencrypted video data period (including unencrypted video content 550) enters an enhanced transmitter 510 where the data stream is partially encrypted. The data stream's partial encryption includes encryption of the control content 560 and the video content 570, while leaving the audio content unencrypted 545. The enhanced transmitter 510, using partial encryption mechanism, produces the encrypted control and video content 560, 570. For example, as described with reference to FIG. 4B, feature values may be sent from HDCP registers to the enhanced transmitter 510 to determine the type of content of the data stream that is to be encrypted or left unencrypted.

In the illustrated embodiment, all content of the data stream including encrypted control content 560 as well as both the encrypted video content and the unencrypted audio content are sent to a bridge device 520. Since the audio content 545 remain unencrypted, in one embodiment, it is played through an audio device 525 of the bridge device. The encrypted video content 570 and the encrypted control content 560, in one embodiment, are sent to a downstream HDCP sink or receiving device 530.

Figure 6:
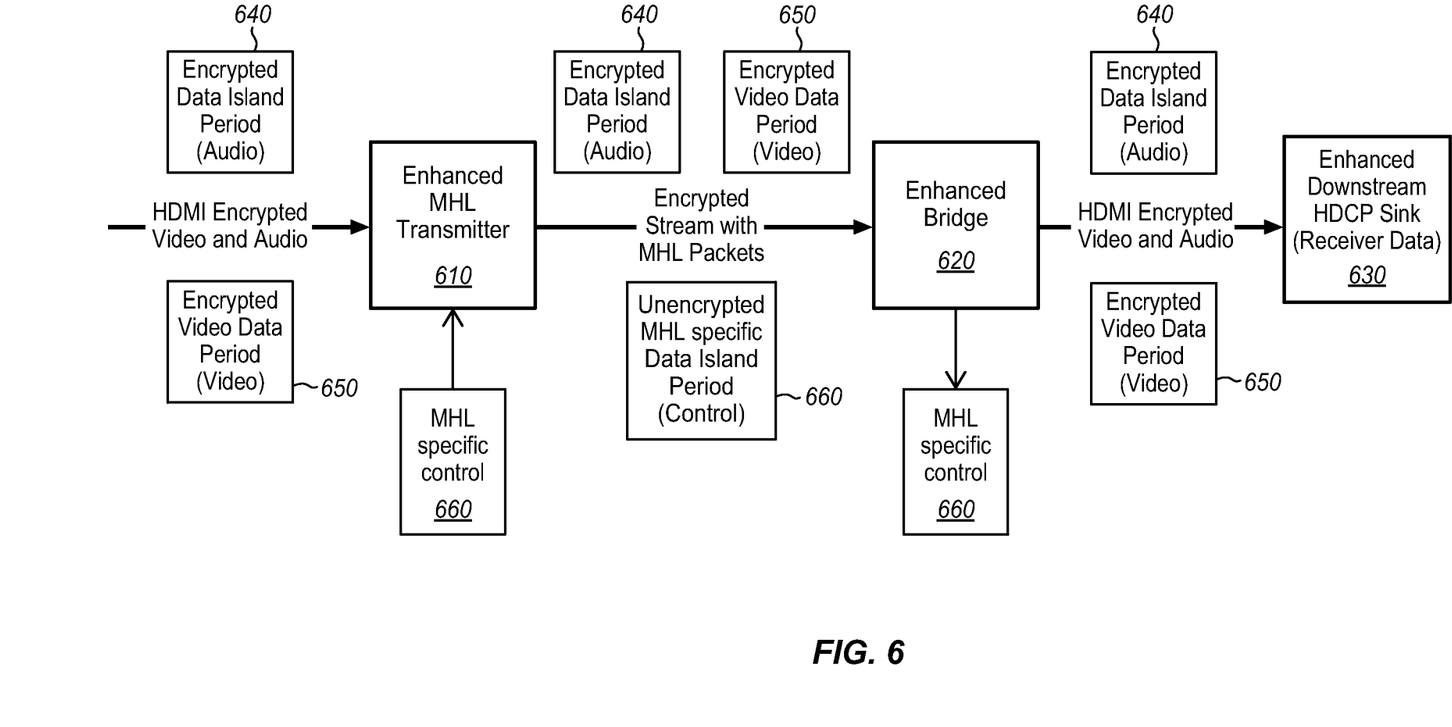
FIG. 6 illustrates partial encryption of a data stream according to one embodiment of the invention.

FIG. 6 illustrates partial encryption of a data stream according to one embodiment of the invention. An HDMI-based data stream, including encrypted audio content 640 and encrypted video content 650, is provided to an enhanced MHL-based transmitter 610. In one embodiment, the enhanced MHL transmitter 610, using the partial encryption mechanism, inserts a set flag character after the leading guardband of each of the encrypted audio content 640 and the encrypted video content 650 so that downstream enhanced transmitter HDCP sink device, using the (sink) partial encryption control mechanism, can detect encrypted content periods 640, 650 as encrypted.

Further, in one embodiment, the enhanced MHL transmitter 610 may insert, within the limits of the control period widths, a new data island period including control content 660. In the illustrated embodiment, the MHL-specific control content 660 is unencrypted and thus, it is indicated by having included an unset flag character after the leading guardband of the control content MHL-specific data island period 660. As with the encrypted audio and video content 640, 650, this unset flag charter is associated with the unencrypted control content 660 so that the enhanced bridge 620 and the enhanced receiver 630 can recognize the control content 660 to be unencrypted and this is done without affecting the stream of the encrypted audio and video content 640, 650. Further, in one embodiment, the downstream MHL bridge 620, using the (bridge) partial encryption control mechanism, detects the encrypted audio and video content 640, 650 as well as the unencrypted control content 660, and provides for review, analysis and even removal, if desired or necessitated, of the unencrypted MHL-specific control content 660 from the data stream. The HDMI encrypted audio and video content 640, 650 is then provided to the downstream HDCP sink 630 or port processor or even another enhanced bridge device.

Figure 7:
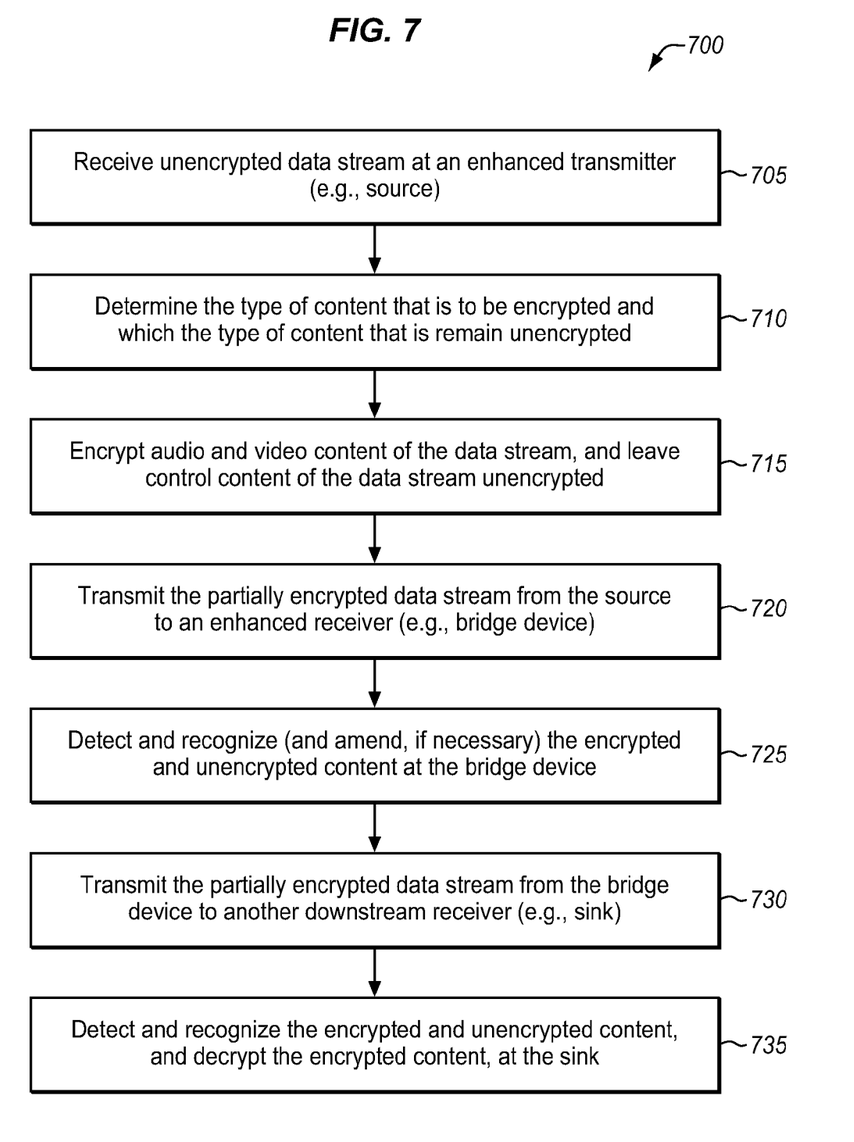
FIG. 7 illustrates a method for performing partial encryption of a data stream according to one embodiment of the invention.

FIG. 7 illustrates a method for performing partial encryption of a data stream according to one embodiment of the invention. Method 700 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 700 is performed by partial encryption mechanism and/or partial encryption control mechanism of FIG. 1.

Method 700 starts at block 705 when an unencrypted data stream is received at an enhanced transmitter or source. The data stream includes an HDMI data stream including three types of content: audio content, video content, and control content. Which type of content of the data stream is to be encrypted may be decided by the content provider (e.g., content producer, broadcaster, cable headend, etc.) and is communicated to the enhanced transmitter using one or more feature values as aforementioned at block 710. The enhanced transmitter, in this case, is an enhanced HDCP transmitter. In this embodiment, using the partial encryption mechanism at the enhanced transmitter, content types audio and video are encrypted, but the control content is left unencrypted at block 715. At block 720, this partially encrypted data stream is provided to an enhanced receiving device, such as a bridge device.

If the enhanced receiving device is a bridge device, it receives the partially encrypted data stream and detects and recognizes the encrypted and unencrypted content using a bridge partial encryption control mechanism by reading the flag character inserts of the data island and video data periods at block 725. For example, in one embodiment, the enhanced transmitter inserts flag characters (such as flag on for encrypted content and flag off for unencrypted content) immediately following the leading guardbands of the encrypted data island period for the audio content, the encrypted video data period for the video content, and the unencrypted data island period of the control content. In some embodiments, at the enhanced bridge device, the unencrypted control content may be read, accessed, analyzed and amended without having to decrypt the entire data stream as necessitated and desired.

In one embodiment, the partially encrypted data stream is then transmitted to a downstream enhanced HDCP receiver (such as a sink) at block 730. As with the bridge device, the enhanced receiver may include and use a sink partially encrypted control mechanism to detect and recognize encrypted and unencrypted content of the data stream at block 735.

Figure 8:
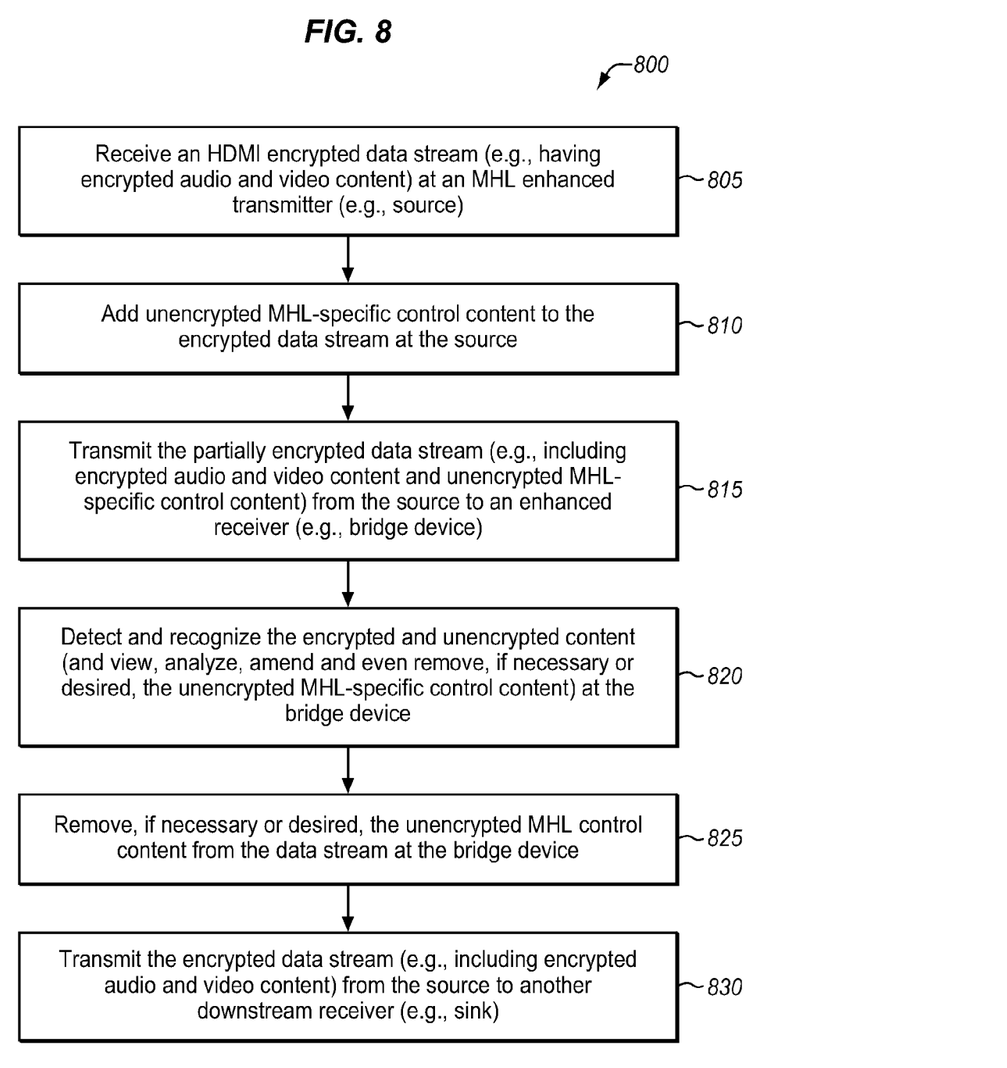
FIG. 8 illustrates a method for performing partial encryption of a data stream according to one embodiment of the invention.

FIG. 8 illustrates a method for performing partial encryption of a data stream according to one embodiment of the invention. Method 800 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 800 is performed by partial encryption mechanism and/or partial encryption control mechanism of FIG. 1.

In one embodiment, an HDMI encrypted data stream having an encrypted audio content (in data island period) and an encrypted video content (in video data period) is received at an MHL enhanced transmitter or source at block 805. The enhanced transmitter having a partial encryption mechanism reads the encrypted audio and video content and may add unencrypted MHL-specific control content to the data stream at 810. This partially encrypted data stream (such as having the encrypted audio and video content and the newly-added unencrypted MHL-specific control content) is transmitted to an enhanced bridge device at block 815. The bridge device detects the partially encrypted data stream (such as using flag characters) and allows access to its unencrypted MHL-specific control content without having to decrypt the entire data stream at block 820. The added unencrypted MHL-specific control content may then be removed from the data stream at block 825. The remaining encrypted data stream (such as having the encrypted audio and video content) is then sent to a downstream HDCP receiver or sink at block 830. The sink device may be a "regular" sink or an "enhanced" sink Sending a data stream to a "regular" sink device involves (a) knowing that the sink is "regular" and not "enhanced" (such as through a DDC command or a CBUS command), and (b) stripping out the inserted flag characters from the video data periods and data island periods if the sink is "regular".

Figure 9:
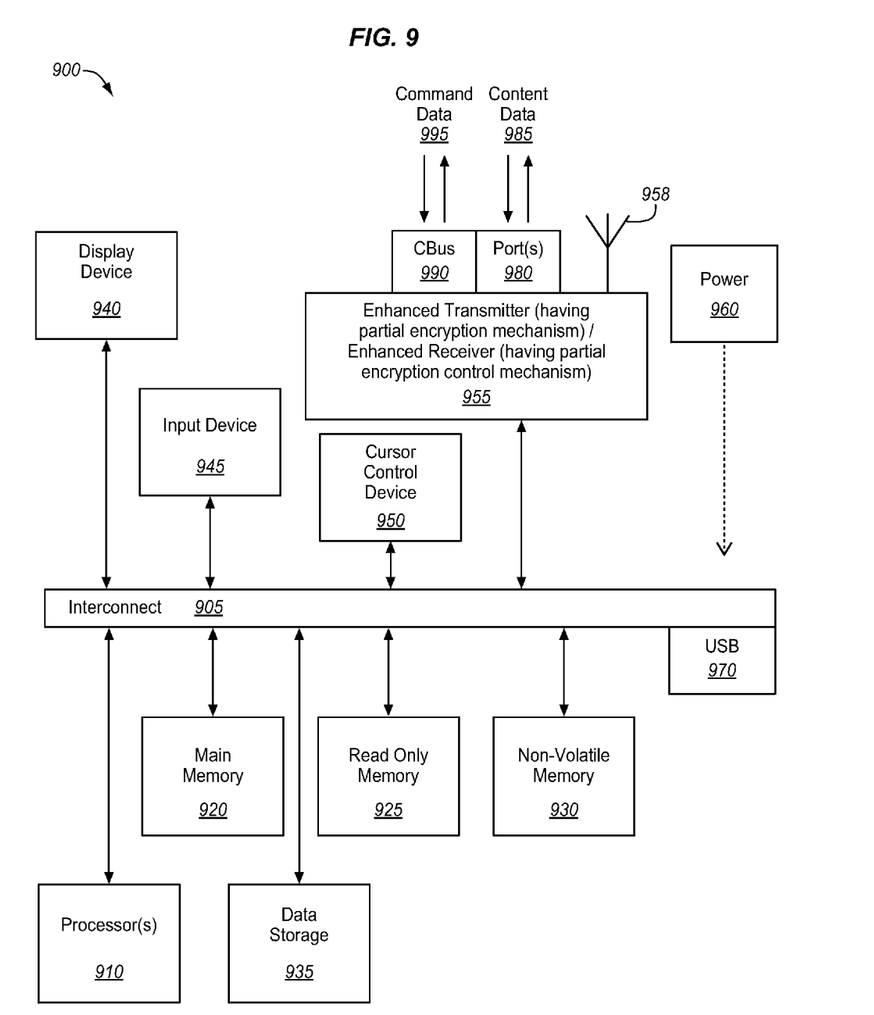
FIG. 9 is an illustration of elements of a system capable of employing embodiments of the present invention.

FIG. 9 illustrates a system for employing transmitters and receivers having partial encryption mechanisms of FIG. 1 according to one embodiment of the invention. In this illustration, certain standard and well known components that are not germane to the present description are not shown. Under some embodiments, a device 900 may be a transmitting device, a receiving device, or both.

Under some embodiments, the device 900 comprises an interconnect or crossbar 905 or other communication means for transmission of data. The data may include audio-visual data and related control data. The device 900 may include a processing means such as one or more processors 910 coupled with the interconnect 905 for processing information. The processors 910 may comprise one or more physical processors and one or more logical processors. Further, each of the processors 910 may include multiple processor cores. The interconnect 905 is illustrated as a single interconnect for simplicity, but may represent multiple different interconnects or buses and the component connections to such interconnects may vary. The interconnect 905 shown here is an abstraction that represents any one or more separate physical buses, point-to-point connections, or both connected by appropriate bridges, adapters, or controllers. The interconnect 905 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 900 further may include a serial bus, such as USB bus 970, to which may be attached one or more USB compatible connections.

In some embodiments, the device 900 further comprises a random access memory (RAM) or other dynamic storage device as a main memory 920 for storing information and instructions to be executed by the processors 910. Main memory 920 also may be used for storing temporary variables or other intermediate information during execution of instructions by the processors 910. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 900 also may comprise a read only memory (ROM) 925 or other static storage device for storing static information and instructions for the processors 910. The device 900 may include one or more non-volatile memory elements 930 for the storage of certain elements.

Data storage 935 may also be coupled to the interconnect 905 of the device 900 for storing information and instructions. The data storage 935 may include a magnetic disk, an optical disc and its corresponding drive, or other memory device. Such elements may be combined together or may be separate components, and utilize parts of other elements of the device 900.

The device 900 may also be coupled via the interconnect 905 to a display or presentation device 940. In some embodiments, the display may include a liquid crystal display (LCD), a plasma display, a cathode ray tube (CRT) display, or any other display technology, for displaying information or content to an end user. In some embodiments, the display 940 may be utilized to display television programming. In some environments, the display 940 may include a touch-screen that is also utilized as at least a part of an input device. In some environments, the display 940 may be or may include an audio device, such as a speaker for providing audio information, including the audio portion of a television program. An input device 945 may be coupled to the interconnect 905 for communicating information and/or command selections to the processors 910. In various implementations, the input device 945 may be a keyboard, a keypad, a touch screen and stylus, a voice activated system, or other input device, or combinations of such devices. Another type of user input device that may be included is a cursor control device 950, such as a mouse, a trackball, or cursor direction keys for communicating direction information and command selections to the one or more processors 910 and for controlling cursor movement on the display 940.

One or more transmitters or receivers 955 may also be coupled to the interconnect 905. In one embodiment, a transmitter 955 includes an enhanced transmitter or source employing a partial encryption mechanism, while a receiver 955 includes a bridge device employing a bridge partial encryption mechanism or an end/downstream enhanced receiver or sink employing a sink partial encryption mechanism as described with reference to FIG. 1. In some embodiments the device 900 may include one or more ports 980 for the reception or transmission of data. Data that may be received or transmitted may include video data or audio-video data, such as HDMI data, and may be encrypted, such as HDCP encrypted data. In some embodiments, the device 900 is a receiving device, and operates to select a port for the reception of data, while sampling data from one or more other ports to determine whether the data received at the ports that have not been selected for foreground processing is encrypted. The device 900 may further include one or more antennas 958 for the reception of data via radio signals. The device 900 may also comprise a power device or system 960, which may comprise a power supply, a battery, a solar cell, a fuel cell, or other system or device for providing or generating power. The power provided by the power device or system 960 may be distributed as required to elements of the device 900.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs which are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magnetooptical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method performed at a source device, the method comprising:
   receiving a first type of content selected from a group of audio content, video content, and control content, and a second type of content selected from the group, the second type of content different from the first type of content;
   determining the first type of content to be encrypted and the second type of content to remain unencrypted;
   inserting, in a data stream, a first flag between a first guardband character and the first type of content, the first flag indicating the first type of content to be encrypted for transmission of the first type of content;
   inserting, in the data stream, a second flag between a second guardband character and the second type of content, the second flag indicating the second type of content to remain unencrypted during transmission of the second type of content;
   encrypting the first type of content but not the second type of content, an encrypted version of the first type of content accessible by an intermediate device but not by a sink device, an unencrypted version of the second type of content accessible by the intermediate device and the sink device, the intermediate device separate and distinct from the source device and the sink device, the intermediate device performing analysis or modification of the data stream based on the first flag indicating the first type of content to be encrypted and the second flag indicating the second type of content to remain unencrypted, and sending the analyzed or modified data stream to the sink device; and
   transmitting the data stream including the first flag, the encrypted version of the first type of content, the second flag, and the unencrypted version of the second type of content to the intermediate device.

2. The method of claim 1, wherein the first type of content and the second type of content comprise High-Definition Multimedia Interface (HDMI)-based contents or Mobile High-Definition Link (MHL)-based contents, and wherein the encryption of the first type of content is based on a High-bandwidth Digital Content Protection (HDCP) protocol.

3. A system comprising:
   a source device configured to:
      receive a first type of content selected from a group of audio content, video content, and control content, and a second type of content selected from the group, the second type of content different from the first type of content,
      determine the first type of content to be encrypted and the second type of content to remain unencrypted,
      insert, in a data stream, a first flag between a first guardband character and the first type of content, the first flag indicating the first type of content to be encrypted for transmission of the first type of content,
      insert, in the data stream, a second flag between a second guardband character and the second type of content, the second flag indicating the second type of content to remain unencrypted during transmission of the second type of content,
      encrypt the first type of content but not the second type of content, an encrypted version of the first type of content accessible by an intermediate device but not by a sink device, an unencrypted version of the second type of content accessible by the intermediate device and the sink device, the intermediate device separate and distinct from the source device and the sink device, the intermediate device performing analysis or modification of the data stream based on the first flag indicating the first type of content to be encrypted and the second flag indicating the second type of content to remain unencrypted, and sending the analyzed or modified data stream to the sink device, and
      transmit the data stream including the first flag, the encrypted version of the first type of content, the second flag, and the unencrypted version of the second type of content to the intermediate device;
   the intermediate device performing analysis or modification of the data stream based on the first flag and the second flag, and sending the analyzed or modified data stream to the sink device; and
   the sink device to receive the analyzed or modified data stream from the intermediate device.

4. The system of claim 3, wherein the source device comprises a partial encryption mechanism to encrypt the first type of content of the data stream.

5. The system of claim 3, wherein the first type of content and the second type of content comprise High-Definition Multimedia Interface (HDMI)-based contents or Mobile High-Definition Link (MHL)-based contents, and wherein the encryption of the first type of content is based on a High-bandwidth Digital Content Protection (HDCP) protocol.

6. An apparatus comprising:
a receiver configured to receive a first type of content selected from a group of audio content, video content, and control content, and a second type of content selected from the group, the second type of content different from the first type of content;
a partial encryption mechanism configured to:
determine the first type of content to be encrypted and the second type of content to remain unencrypted,
insert, in a data stream, a first flag between a first guardband character and the first type of content, the first flag indicating the first type of content to be encrypted for transmission of the first type of content,
insert, in the data stream, a second flag between a second guardband character and the second type of content, the second flag indicating the second type of content to remain unencrypted during transmission of the second type of content, and
encrypt the first type of content but not the second type of content, an encrypted version of the first type of content accessible by an intermediate device but not by a sink device, an unencrypted version of the second type of content accessible by the intermediate device and the sink device, the intermediate device separate and distinct from the apparatus and the sink device, the intermediate device performing analysis or modification of the data stream based on the first flag indicating the first type of content to be encrypted and the second flag indicating the second type of content to remain unencrypted, and sending the analyzed or modified data stream to the sink device; and
a transmitter configured to transmit the data stream including the first flag, the encrypted version of the first type of content, the second flag, and the unencrypted version of the second type of content to the intermediate device.

7. The apparatus of claim 6, wherein the first type of content and the second type of content comprise High-Definition Multimedia Interface (HDMI)-based contents or Mobile High-Definition Link (MHL)-based contents, and wherein the encryption of the first type of content is based on a High-bandwidth Digital Content Protection (HDCP) protocol.

8. A non-transitory machine-readable medium having stored thereon instructions which, when executed by a machine, cause a source device to:
receive a first type of content selected from a group of audio content, video content, and control content, and a second type of content selected from the group, the second type of content different from the first type of content;
determine the first type of content to be encrypted and the second type of content to remain unencrypted;
insert, in a data stream, a first flag between a first guardband character and the first type of content, the first flag indicating the first type of content to be encrypted for transmission of the first type of content;
insert, in the data stream, a second flag between a second guardband character and the second type of content, the second flag indicating the second type of content to remain unencrypted during transmission of the second type of content;
encrypt the first type of content but not the second type of content, an encrypted version of the first type of content accessible by an intermediate device but not by a sink device, an unencrypted version of the second type of content accessible by the intermediate device and the sink device, the intermediate device separate and distinct from the source device and the sink device, the intermediate device performing analysis or modification of the data stream based on the first flag indicating the first type of content to be encrypted and the second flag indicating the second type of content to remain unencrypted, and sending the analyzed or modified data stream to the sink device; and
transmit the data stream including the first flag, the encrypted version of the first type of content, the second flag, and the unencrypted version of the second type of content to the intermediate device.

9. The non-transitory machine-readable medium of claim 8, wherein the first type of content and the second type of content comprise High-Definition Multimedia Interface (HDMI)-based contents or Mobile High-Definition Link (MHL)-based contents, and wherein the encryption of the first type of content is based on a High-bandwidth Digital Content Protection (HDCP) protocol.

10. The method of claim 1, wherein the first guardband character comprises a value indicating encrypted data island period or encrypted video data period, and wherein the second guardband character comprises another value indicating unencrypted data island period or unencrypted video data period.

11. The system of claim 3, wherein the first guardband character comprises a value indicating encrypted data island period or encrypted video data period, and wherein the second guardband character comprises another value indicating unencrypted data island period or unencrypted video data period.

12. The apparatus of claim 6, wherein the first guardband character comprises a value indicating encrypted data island period or encrypted video data period, and wherein the second guardband character comprises another value indicating unencrypted data island period or unencrypted video data period.

13. The non-transitory machine-readable medium of claim 8, wherein the first guardband character comprises a value indicating encrypted data island period or encrypted video data period, and wherein the second guardband character comprises another value indicating unencrypted data island period or unencrypted video data period.

14. The method of claim 1, further comprising removing one or more portions of the second type of content from the data stream without affecting the first type of content or decryption of the first type of content at the sink device.

15. The non-transitory machine-readable medium of claim 8, further comprising instructions when executed by the machine cause the source device to remove one or more portions of the second type of content from the data stream without affecting the first type of content or decryption of the first type of content at the sink device.

* * * * *